(12) United States Patent
Morris

(10) Patent No.: US 7,434,217 B2
(45) Date of Patent: Oct. 7, 2008

(54) METHOD AND SYSTEM FOR DISTRIBUTING A SOFTWARE APPLICATION TO A SPECIFIED RECIPIENT

(75) Inventor: Robert P. Morris, Raleigh, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 526 days.

(21) Appl. No.: 10/818,598

(22) Filed: Apr. 6, 2004

(65) Prior Publication Data
US 2005/0223376 A1 Oct. 6, 2005

(51) Int. Cl.
*G06F 9/445* (2006.01)
(52) U.S. Cl. .................................... 717/177
(58) Field of Classification Search ......... 717/174–178; 709/205, 206, 223, 226; 705/27, 51, 54; 707/101, 102, 104.1; 725/37, 41, 61, 142; 358/1.15, 1.18; 713/165; 434/322
See application file for complete search history.

(56) References Cited
U.S. PATENT DOCUMENTS

| 6,449,635 | B1 | 9/2002 | Tilden, Jr. et al. ............ 709/206 |
| 2001/0031454 | A1* | 10/2001 | Mintz .......................... 434/322 |
| 2002/0073312 | A1* | 6/2002 | Adiano et al. ................ 713/165 |
| 2003/0145056 | A1* | 7/2003 | Fujisawa et al. ............. 709/205 |
| 2003/0182210 | A1* | 9/2003 | Weitzman et al. ............. 705/27 |

* cited by examiner

Primary Examiner—Tuan Anh Vu

(57) ABSTRACT

The present invention is related to a computer-implemented method and system for allowing a user to distribute an application in an electronic device to at least one specified recipient. The method according to the present invention includes invoking a share function in the electronic device by the user, and in response to the user invoking the share function, transmitting automatically an install image associated with the application to the at least one specified recipient. According to the present invention, the install image is an installable copy of the application.

32 Claims, 11 Drawing Sheets

METHOD AND SYSTEM FOR DISTRIBUTING A SOFTWARE APPLICATION TO A SPECIFIED RECIPIENT

FIELD OF THE INVENTION

The present invention relates to networked communications, and more particularly to, a method and system for using a computer system to distribute a software application to a specified recipient.

BACKGROUND OF THE INVENTION

Software applications for computer systems are widely available in retail stores, mail-order catalogs, and via the Internet, for example. Typically, a user who purchases a software application package either installs the application directly onto his or her computer system via removable media, e.g., compact disk (CD) or DVD, or downloads the application via a network communication, such as the Internet. If the user wishes to share the application with another user, e.g., a coworker, the user can provide the removable media, if such is available, to the coworker so that the coworker can install the application on the coworker's computer system. If the removable media is not available, the coworker might be able to download the application from the user's computer system, or copy the application from a network hard drive. Alternatively, the user might be able to transmit the application in an electronic message to the coworker via email.

Each of the distribution mechanisms described above are functional, but cumbersome for the user. In every instance, the user must perform numerous tasks to share the application or module. For example, to distribute the application by email, the user must invoke the email program, browse through the hard drive to retrieve the installation file(s), and attach the installation file(s) to the email message. In another example, to distribute the application by FTP, the user must place the installation image or files on an available FTP server, notify the intended recipients that the application is on the server, and provide security and location information to the recipients.

Moreover, even if the user is able and willing to perform the tasks needed to distribute the application, there still remains the problem of determining which file(s) must be provided in order to distribute the application to the recipient. For example, often times, an installation image for the application is not available and the necessary application files are scattered throughout the user's computer system. Identifying and gathering the required application file(s) is not necessarily an intuitive task.

Accordingly, a need exists for an improved system and method that allows a user to use a computer system to distribute a software application or module to others. Furthermore, there exists a need for a system and method for tracking such distribution of software applications. The present invention addresses such a need.

SUMMARY OF THE INVENTION

The present invention provides a computer-implemented method and system for allowing a user to distribute an application in an electronic device to at least one specified recipient. The method according to the present invention includes invoking a share function by the user, and in response to the user invoking the share function, transmitting automatically an install image associated with the application to the at least one specified recipient. According to the present invention, the install image is an installable copy of the application. When it is received by the at least one specified recipient, the install image automatically installs and persistently stores the application onto a device associated with the at least one specified recipient.

Through aspects of the present invention, the software application is provided with an integrated share button that allows the user of the application to automatically distribute the application to a specified recipient. When the share button is selected by the user, a share function is automatically invoked. In one aspect of the invention, the share function sends a self-installing copy of the application, referred to as an install image, from the user's computer to the specified recipient. In another aspect of the invention, the share function asks a computer system to send the install image to the specified recipient. Once the specified recipient receives the install image, the application is installed automatically and persistently stored onto the specified recipient's computer system.

DETAILED DESCRIPTION OF THE INVENTION

The present invention relates to networked communications, and more particularly, to a method and system for distributing an application in a computer system to a specified recipient. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, while the preferred embodiment is described with respect to a photo-album viewing application, the principles described can also be applied to any software application. Thus, the present invention is not intended to be limited to the embodiment shown but is to be accorded the widest scope consistent with the principles and features described herein.

According to a preferred embodiment of the present invention, a user of an application or application module is allowed to distribute the application or module and associated data to a specified recipient via a share function. The share function is automatically invoked when the user selects a share button integrated into the application or module. Typically, an "application" comprises one or more modules. For purposes of the description of the present invention, however, the term "application" will be used to represent both, an application and any module(s) in the application. Thus, concepts that are described with respect to an application are also applicable to a module in the application.

Figure 1:
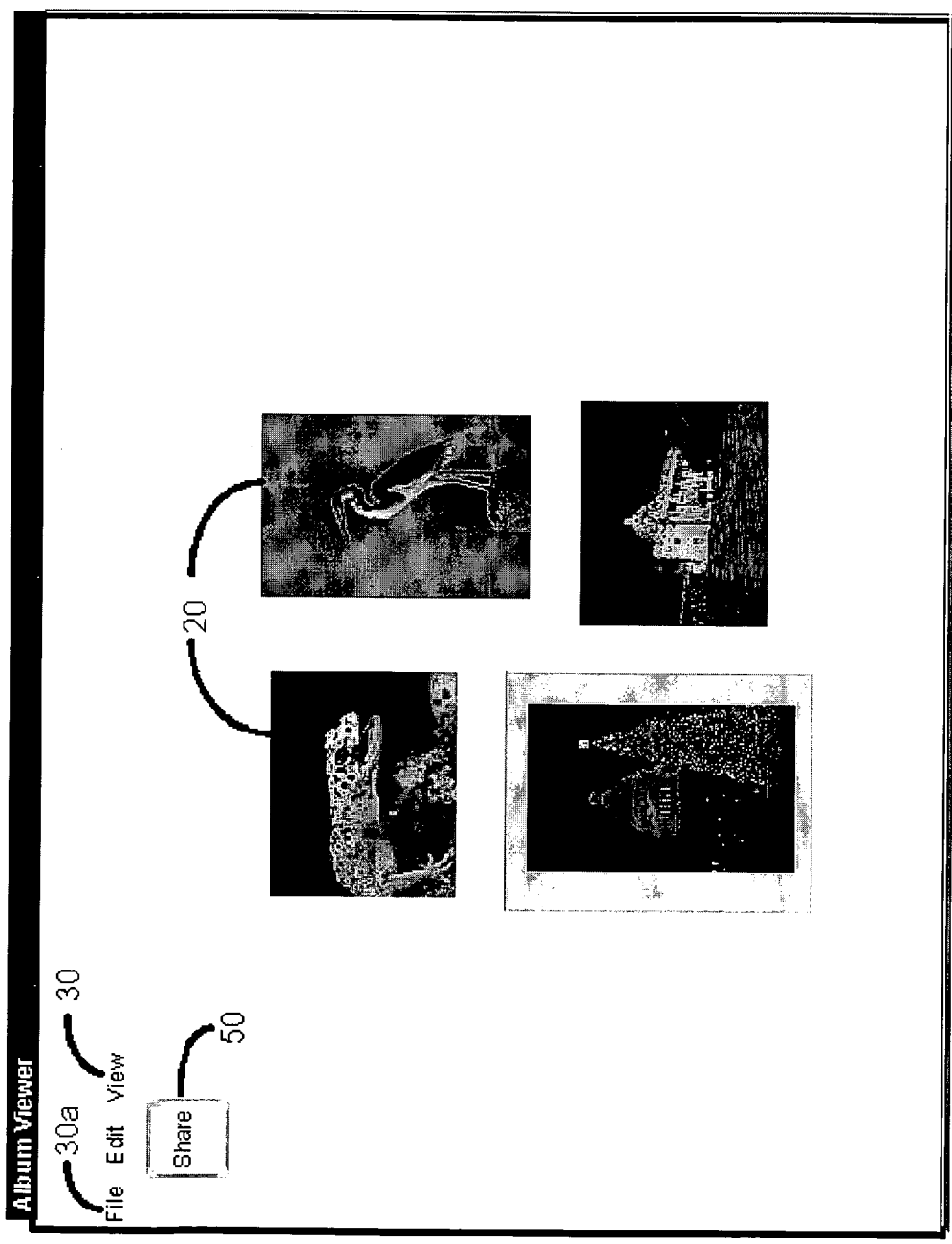
FIG. 1 depicts an exemplary window displayed by a photo-album viewing application.

In FIG. 1 a window displayed by a photo-album viewing application is illustrated. Here, the application displays images 20 in an album viewer window 10. The window 10 includes an integrated Share button 50, which, when selected by the user, invokes the share function. Note that the Share button 50 can also be in a menu item 30, such as the File pull-down menu 30a for example. The share button 50 can also be in a context menu or in a Start menu such that the share function can be invoked without opening the application.

Figure 2:
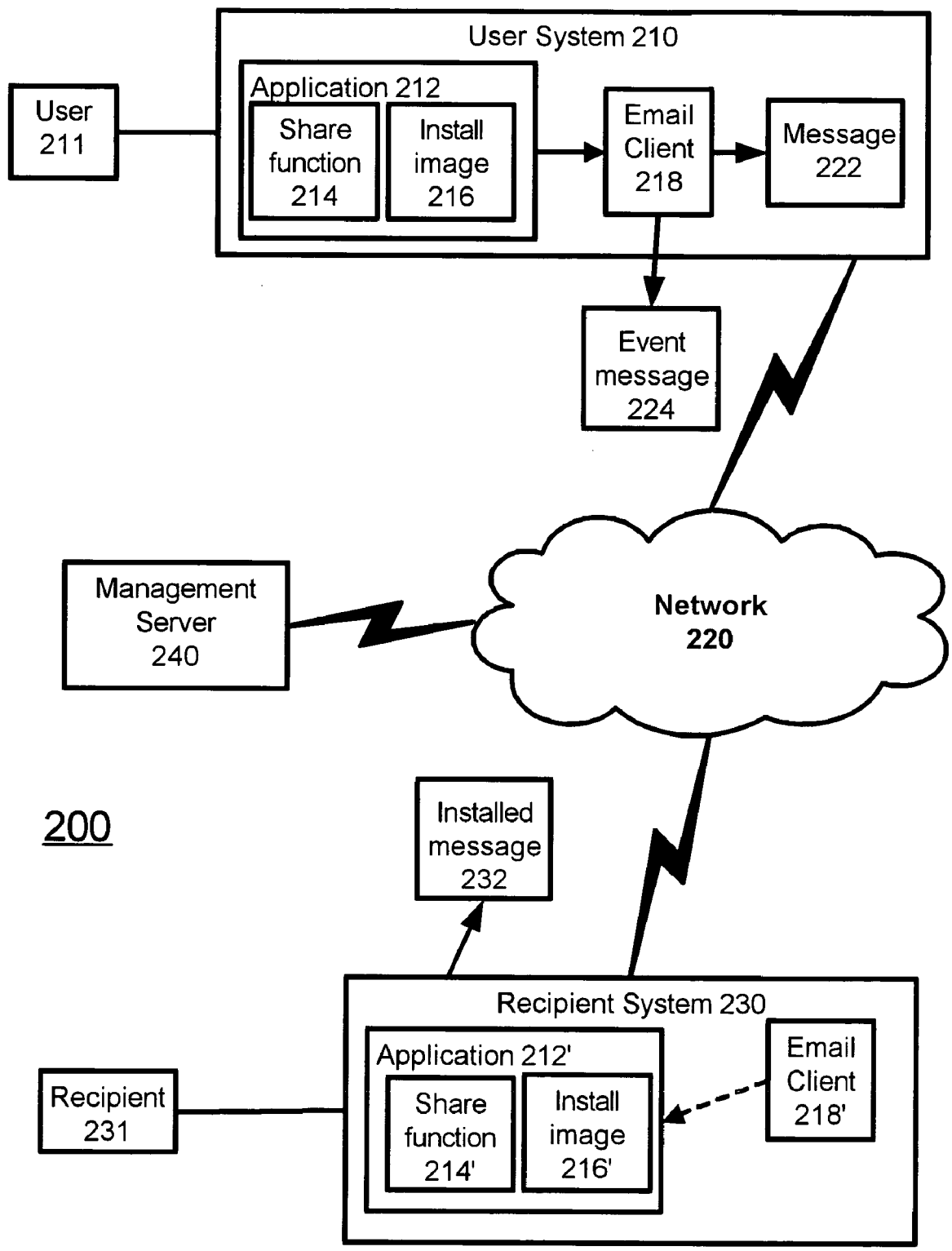
FIG. 2 is a block diagram of a system in which a first preferred embodiment of the present invention may be implemented.

FIG. 2 is a block diagram of a system 200 utilizing the share function according to a first preferred embodiment of the present invention. The system 200 includes a user computer system 210 utilized by a user 211, a recipient computer system 230, and a management server 240. Preferably, the user 210 and recipient 230 systems are personal computers (PCs), workstations or the like. The management server 240 tracks and stores distribution data between the user 210 and recipient 230 systems. The user system 210, recipient system 230, and management server 240 are coupled to one another via a network 220, such as the Internet. The user 210 and recipient 230 systems each include at least one message delivery mechanism, such as an email client 218, 218'.

According to the first preferred embodiment of the present invention, the user system 210 includes an application 212, such as the album viewing application in FIG. 1, that includes a share function 214 and an install image 216, which is a self contained and compressed installable image of the application 212, as is well known to those skilled in the art. In a preferred embodiment, the install image 216 can be self-executing, i.e., auto-installing, such that no other tool is needed to install the associated application 512. This type of install image 216 is also well known in the art.

Although shown as being in the application 212, the share function 214 can also be a separate module outside of the application 212 and accessible by a plurality of applications (not shown). The share function 214 allows the user 211 to distribute the application 212 and any associated data such as images 20 to the recipient system 230 merely by selecting the integrated Share button 50 associated with the application 212.

Figure 3:
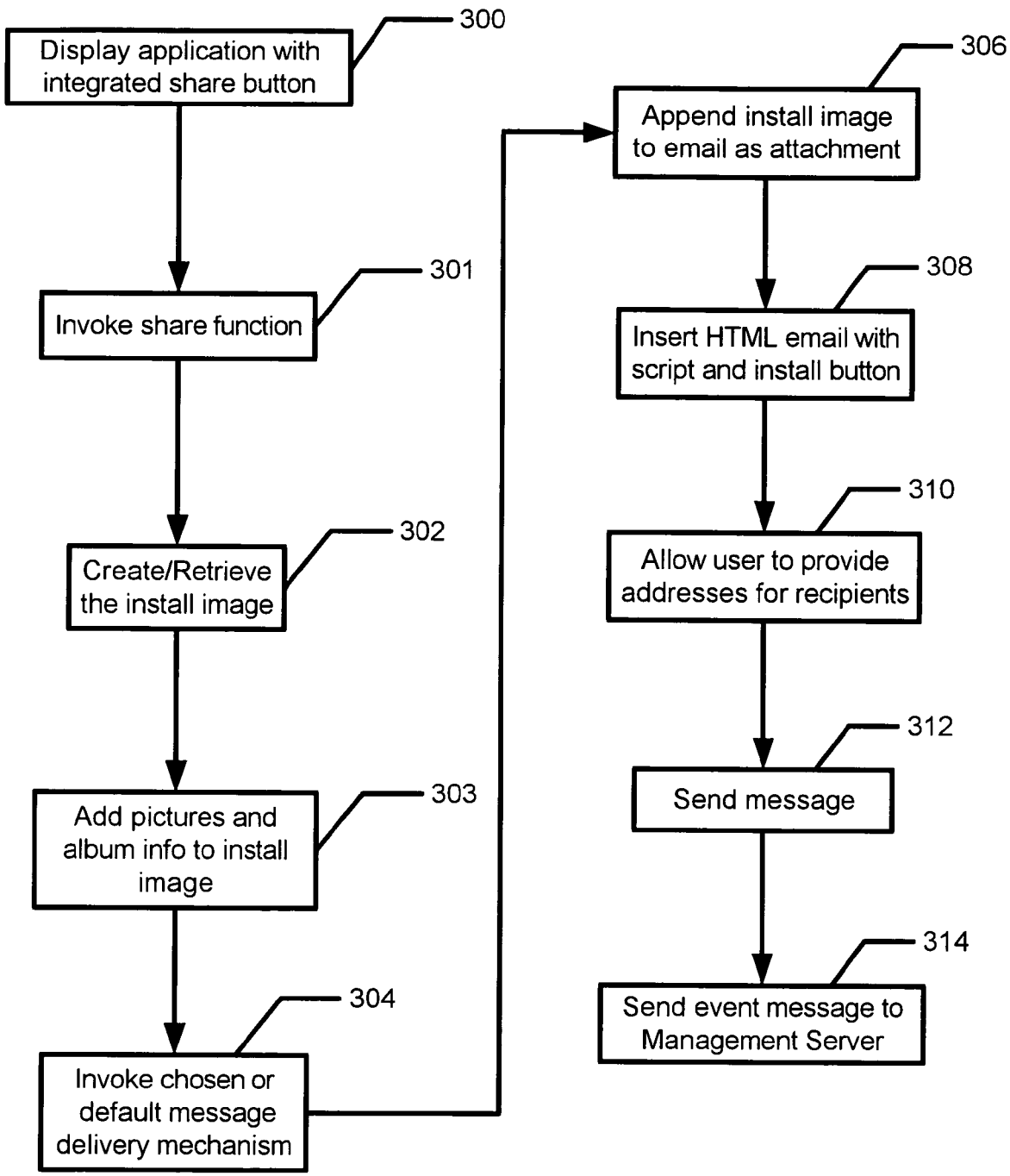
FIG. 3 is a flowchart illustrating a method by which an album viewing application is distributed according to the preferred embodiment of the present invention.

FIG. 3 is a flowchart illustrating a method by which the album viewing application is distributed according to the preferred embodiment of the present invention. Referring to FIG. 2 and FIG. 3, the process begins when the application 212 is displayed to the user 211 with the integrated share button 50, or alternatively, when the share button 50 is displayed in the menu item 30, the context menu or start menu (step 300). The user 211 selects the share button 50 to invoke the share function 214 in the application 212 (step 301). When invoked by the user 211, the share function 214 automatically retrieves or creates the install image 216 associated with the application 212 (step 302). In one embodiment, the share function 214 retrieves the install image 216. In another embodiment, the share function 214 creates the install image 216 by collecting from the user system 210 the files and data needed to install the application 212.

According to one aspect of the present invention, the share function 214 optionally allows the user 211 to add images 20 and album data to the install image 216 associated with the application 212 (step 303). Once the install image 216 is finalized, the share function 214 invokes a message delivery mechanism chosen by the user 211 (step 304) and appends the install image 216 thereto. Preferably, the share function 214 invokes the system's default email client 218 and appends the install image 216 to the email message 222 as an attachment (step 306). In a further aspect of the present invention, the share function 214 optionally inserts a script and an install button into the email message 222 (step 308) so that when the install button is selected by the recipient 230, the attached install image 216 is automatically launched.

In step 310, the user is allowed to designate an address for at least one recipient 230. The nature of the address depends on the delivery mechanism chosen by the user 211. So, for instance, if the delivery mechanism is the email client 218, the address is an email address. Whereas, if the delivery mechanism is an ftp client (not shown), the address is a URL.

After the user 211 has provided at least one address for one or more recipients 230 (step 310), the message 222 is transmitted to the designated recipient(s) 230 (step 312). In step 314, the share function 214 optionally transmits an event message 224 to the management server 240 so that the distribution event can be recorded and tracked by, for example, the licensor or developer of the application 212. The event message 224 preferably includes distribution data relating to the user 211, the recipient(s) 230, the application 212 and other relevant information.

Although FIG. 3 illustrates a process flow according to a first preferred embodiment of the present invention, those skilled in the art will readily appreciate that the order in which the steps are presented is not essential to the practice of the present invention. For instance, the retrieval of the install image 216 (step 302) can be performed after the delivery mechanism has been invoked (step 304), or the user 211 can provide addresses (step 310) earlier in the process, e.g., before the insertion of the script and install button (step 308). Accordingly, the method of the present invention should not be limited by the sequence of steps illustrated in FIG. 3.

Figure 4:
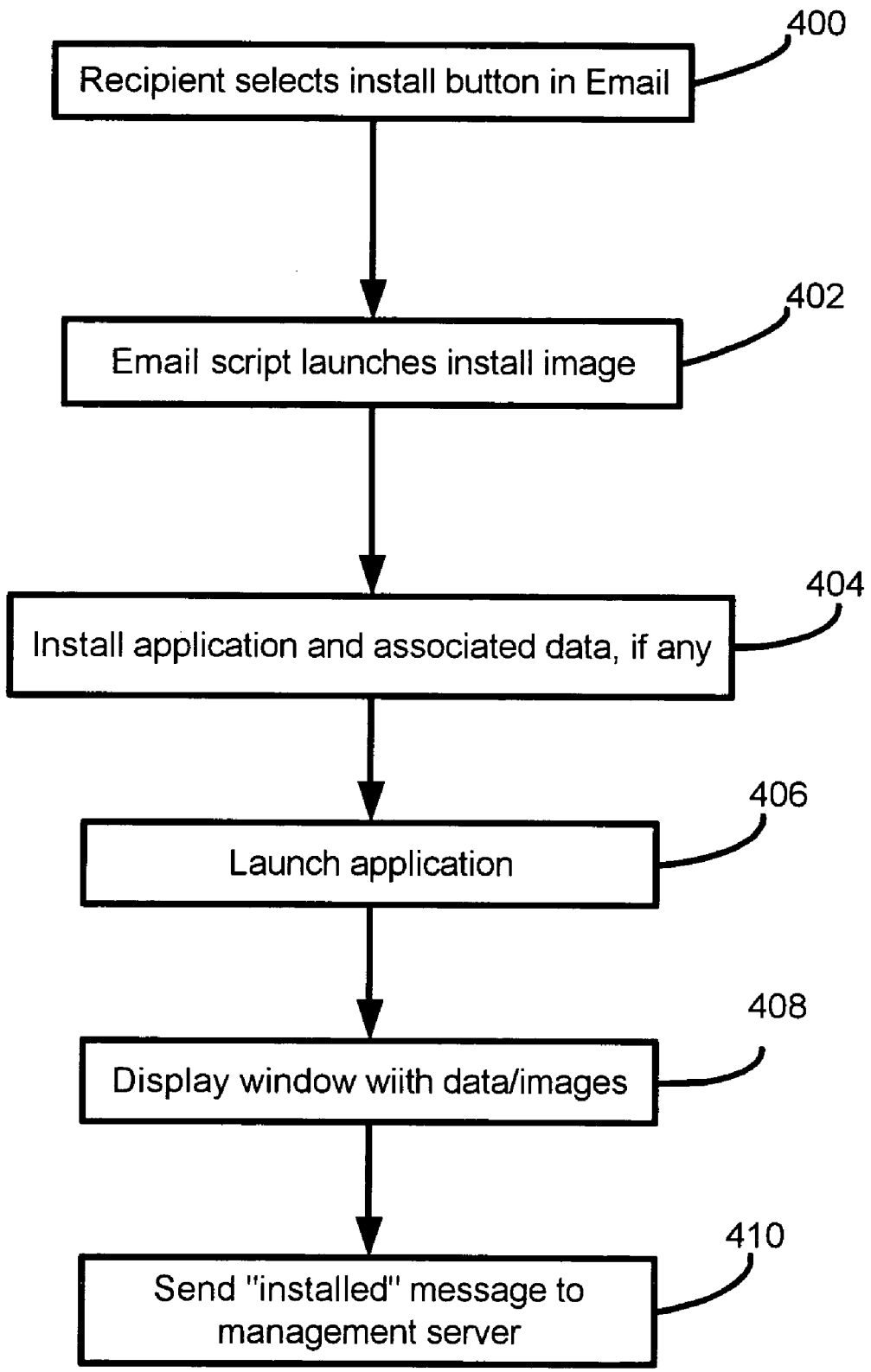
FIG. 4 is a flowchart illustrating a method for installing a software application in a recipient according to the first preferred embodiment of the present invention.

FIG. 4 is a flowchart illustrating a method for installing a software application in a recipient according to the first preferred embodiment of the present invention. Referring to FIG. 2 and FIG. 4, once the recipient system 230 receives the email message 222 including the install image 216, the recipient 231 can select the install button in the email message 222 (step 400), which runs the script that launches the install image 216' (step 402). Alternatively, the recipient 231 can launch the install image 216' automatically by selecting, e.g., double-clicking, the install image 216'. The install image 216' automatically installs the application 212' and any associated data, e.g., images 20, on the recipient system 230 (step 404), and optionally launches the application 212' (step 406). In step 408, the application 212' displays the album window 10 and images 20 shown in FIG. 1.

Once the application 212' is installed onto the recipient system 230, the install image 216' transmits an "installed" message 232 to the management server 240 so that the distribution event can be recorded and tracked (step 410). The installed message 232 preferably includes distribution data relating to the user 211, the recipient(s) 231, the application 212' and other relevant information.

In the first preferred embodiment, illustrated in FIGS. 2, 3 and 4, and described above, the user system 210 transmits the install image 216 associated with the application 212 directly to the recipient system 230. In a second preferred embodiment, the user system 210 submits a request to distribute the application 212 to the management server 240, where the install image 216 is stored and distributed to the recipient system 230 by the management server 240.

Figure 5:
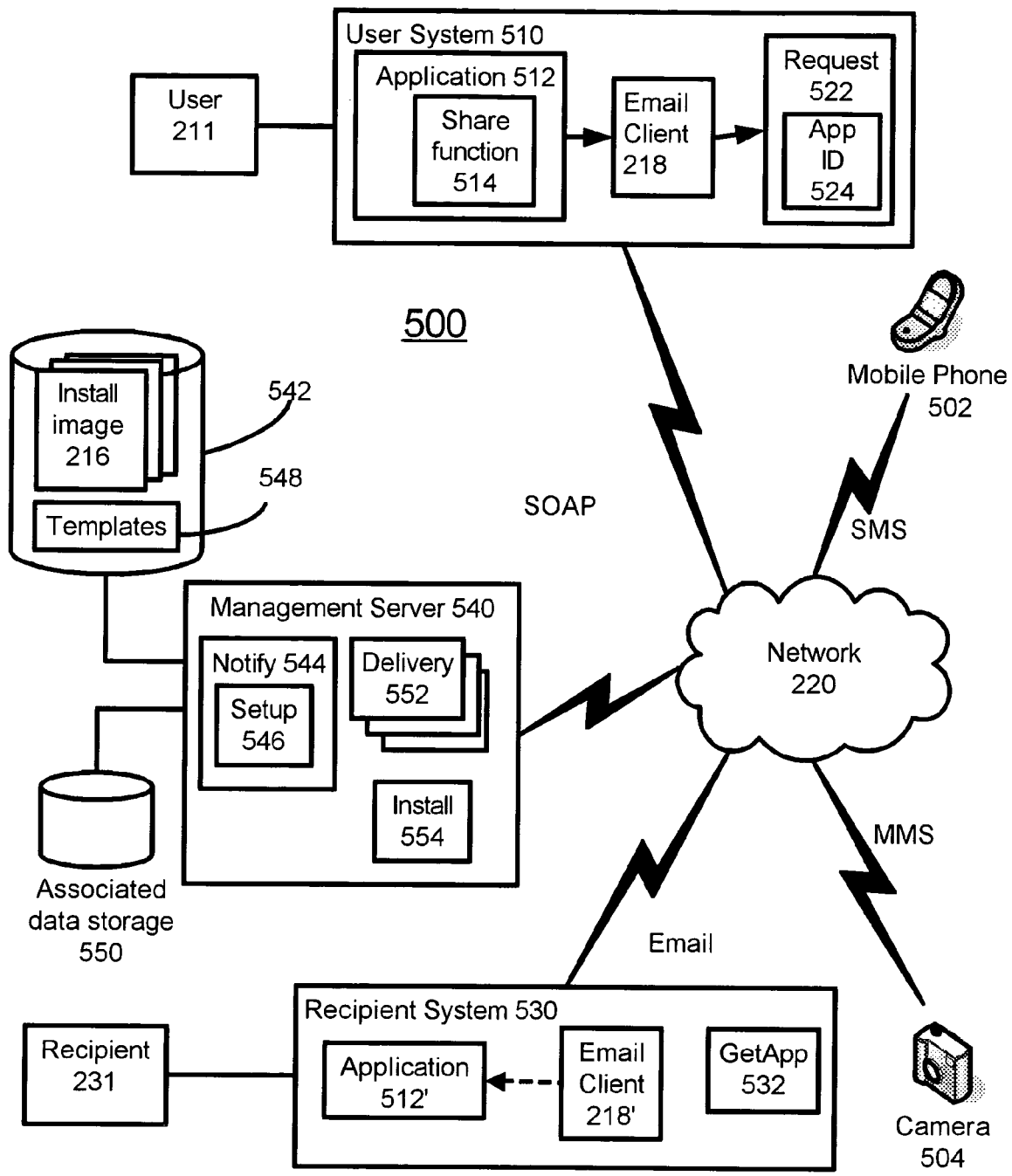
FIG. 5 is a block diagram of a system in which a second preferred embodiment of the present invention may be implemented.

To describe in more detail the second preferred embodiment of the present invention, please refer to FIG. 5, which is a block diagram of the system 500, where similar components are identified by similar reference numerals. Here, in addition to user and recipient systems (510, 530), other network enabled devices, such as a mobile phone 502 and camera 504, are coupled to the network 220. Each component (510, 530, 502, 504) is capable of executing applications 512 and utilizes different communication protocols in order to receive and transmit data. In turn, the management server 540 is capable of accepting communications via a plurality of protocols, e.g., email, SMS, and MMS, to name a few.

According to the second preferred embodiment, a plurality of install images 216 corresponding to a plurality of applications are stored persistently in storage 542 at the management server 540. The plurality of install images 216 include various versions of an application 512 that may be specific to various device types and/or operating environments. For example, the storage 542 includes install images 216 associated with a version of an application 512 that is run on Windows XP™ PCs, a Linux desktop version, a version for Java enabled mobile devices, and various proprietary operating environments. Versioning by language can also be supported, as well as versions of an application 512 based on other criteria, such as custom versions for particular corporate customers and versions based on recipient privileges.

The user system 510 includes the application 512 to be distributed. Note that the application 512 may also reside in any one of the other devices, such as the mobile phone 502 or camera 504, and distributed therefrom. Like the first preferred embodiment, the application 512 comprises the share function 514 which is invoked when the user 211 selects the share button 50 associated with the application 512. Unlike the first preferred embodiment, however, the install image 216 associated with the application 512 is stored in persistent storage 542 at the management server 540.

Figure 6:
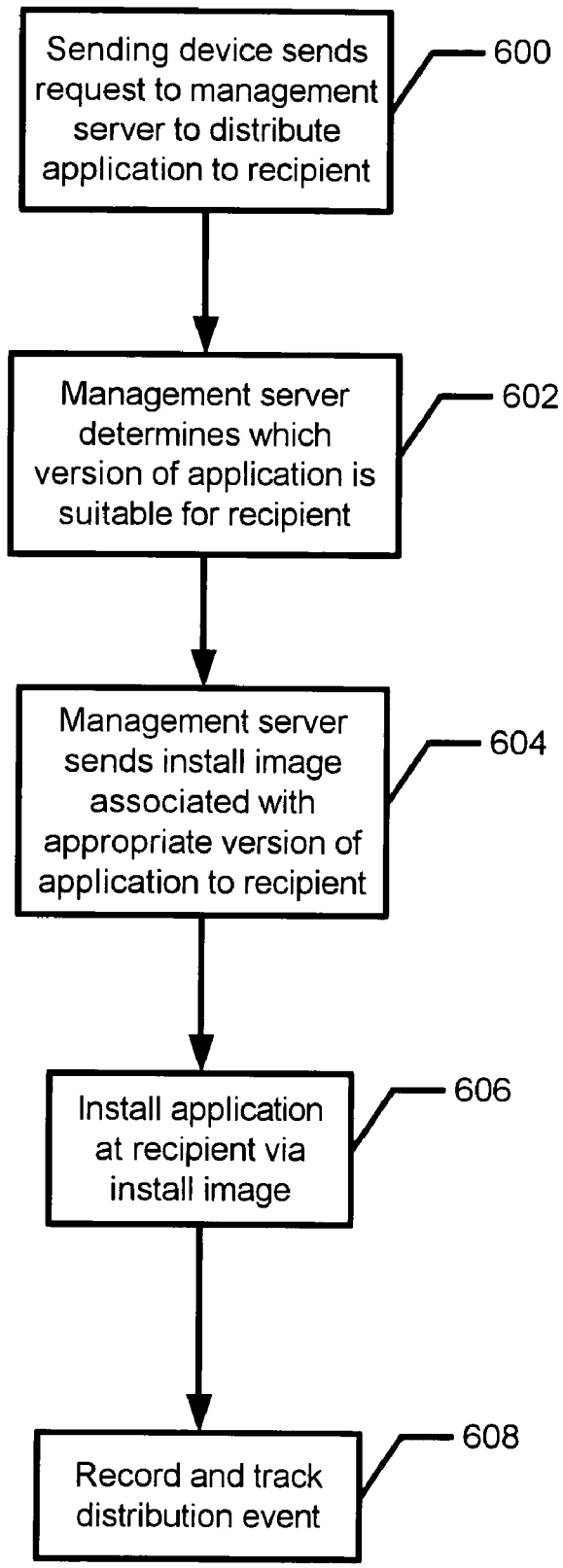
FIG. 6 is a high level flowchart illustrating an application distribution process according to the second preferred embodiment of the present invention.

FIG. 6 is a high level flowchart illustrating an application distribution process according to the second preferred embodiment of the present invention. When the share function 514 is invoked by the user 211, the share function 514 automatically transmits a request to the management server 540 to distribute the application 512 and any associated data to a specified recipient (step 600). In response, the management server 540 determines which version of the application 512 is suitable for the recipient device, e.g., 530 (step 602).

Once the appropriate version of the application is determined, the management server 540 sends the install image 216 associated with that version of the application 512 to the recipient device (step 604), e.g., the recipient system 530, the mobile phone 502, and/or the camera 504. Once the recipient device receives the install image 216, the recipient 231 launches the install image 216 which automatically installs the associated application 512 onto the recipient system 530 (step 606). Lastly, the management server 540 records and tracks the distribution event (step 608).

Figure 7A:
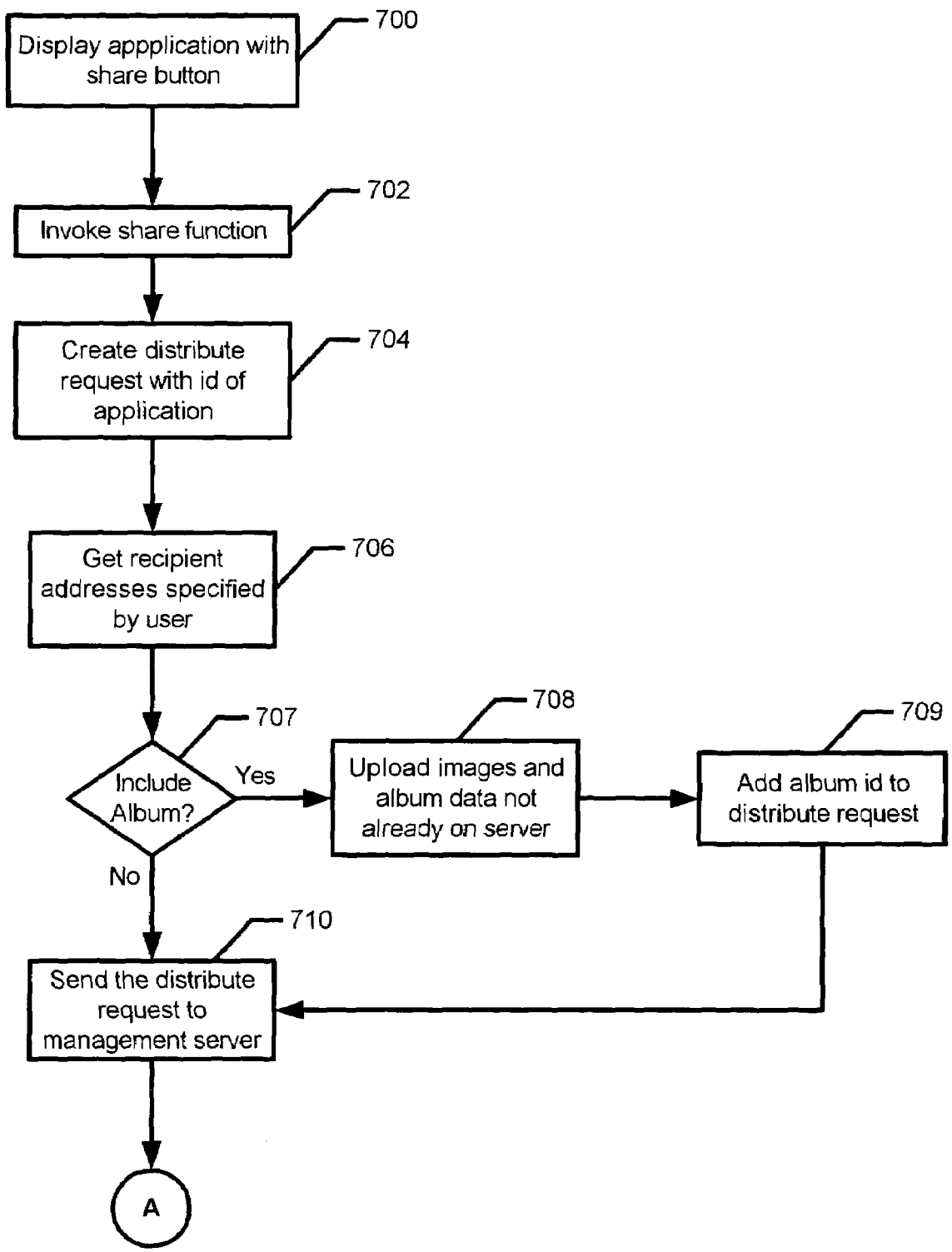
FIGS. 7A-7C are flowcharts illustrating the distribution process in more detail according to the second preferred embodiment of the present invention.
Figure 7B:
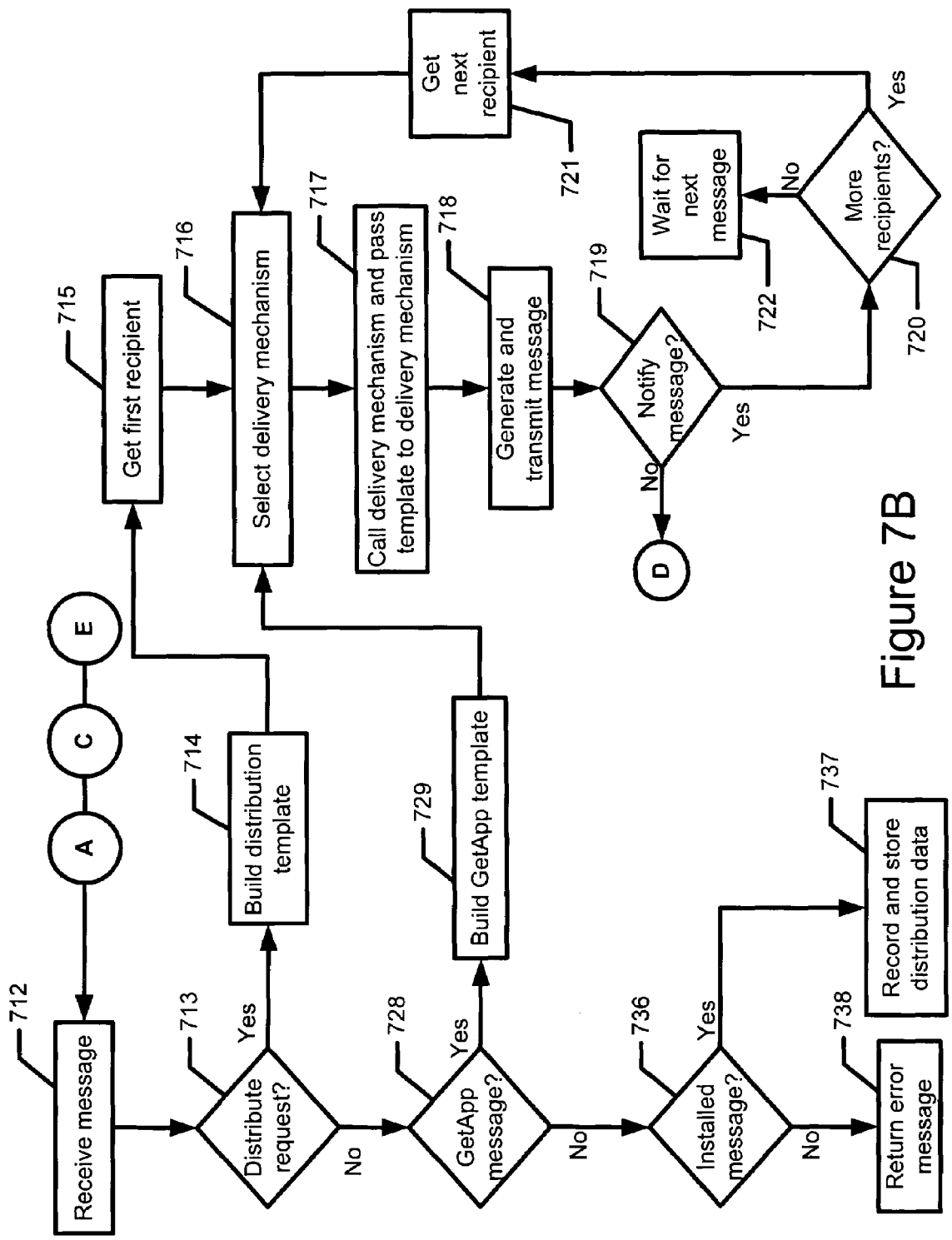
Figure 7C:
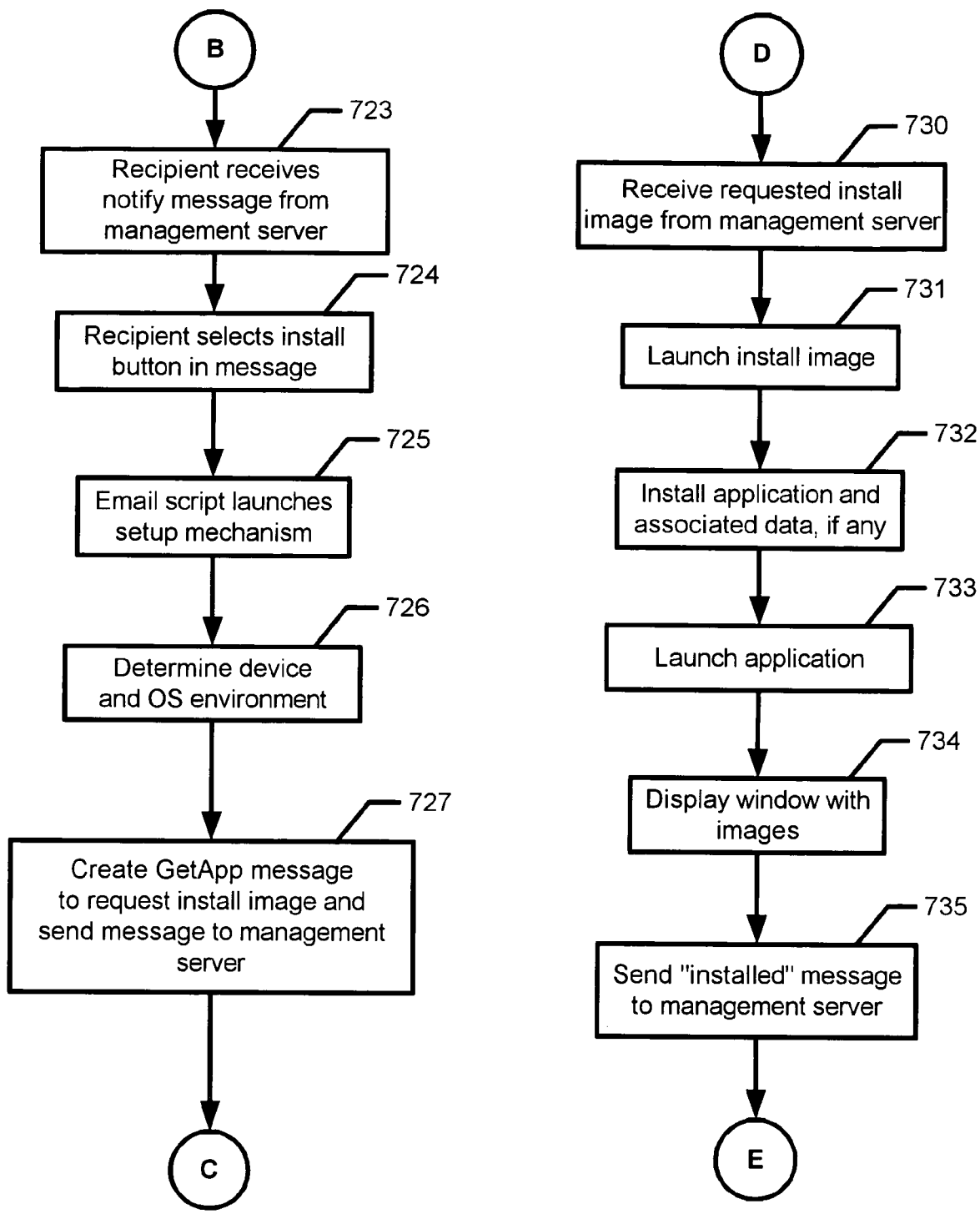

FIGS. 7A, 7B and 7C describe in more detail the distribution process according to the second preferred embodiment of the present invention. FIG. 7A illustrates the method by which the sending device, e.g., user system 510, transmits the request to distribute the application 512 (i.e., step 600 in FIG. 6). FIGS. 7B and 7C illustrates the method by which the management server 540 determines the appropriate version of the application 512 to distribute (i.e., step 602), and the method by which the management server 540 sends the install image to the recipient device 530 (i.e., step 604). FIG. 7C further illustrates the method by which the recipient device 530 installs the application 512 via the install image 216 (i.e., step 606). Note that the sending and receiving devices are not limited to the PCs (510 and 530) and can be other network enabled devices such as the mobile phone 502 or camera 504.

Beginning with FIG. 7A and referring to FIG. 5, the distribution process begins when the application 512, e.g., the photo-album viewing application, is displayed to the user 211 with the integrated share button 50, or alternatively, when the share button 50 is displayed in the menu item 30, the context menu or start menu (step 700). The user 211 selects the share button 50 to invoke the share function 514 in the application 512 (step 702). When invoked by the user 211, the share function 514 automatically creates a "distribute request" 522 that includes an identifier 524 associated with the application 512 to be distributed (step 704). The user 211 is then allowed to provide at least one address for the recipient(s) 530 (step 706). The address can depend on the recipient, e.g., 231, or the recipient device, e.g., 530. Therefore, the address can be an email address, SMS/MMS addresses, a URL or any other type of address including a postal address.

If the user 211 wishes to include other application specific data, such as an album, with the application 512 (step 707), the data not already on the server 550, e.g., images and album data, is uploaded to the management server 540 (step 708). Then, an identifier associated with the uploaded data (not shown) is appended to the distribute request 522 (step 709). When the distribute request 522 is completed, it preferably includes the application identifier 524, the at least one address for the recipient(s) 530, an identifier associated with the user 211, and other data specific to the business purposes of the service provider.

Next, the share function 514 sends the request 522 to the management server 540 (step 710) preferably using a Simple Object Access Protocol (SOAP) call. Notably, the share function 514 can transmit the request 522 using other transport mechanisms because the management server 540 is capable of accepting requests via Email, SMS, MMS, etc. Accordingly, those skilled in the art appreciate that any number of other suitable transport mechanisms may be utilized.

Figure 8A:
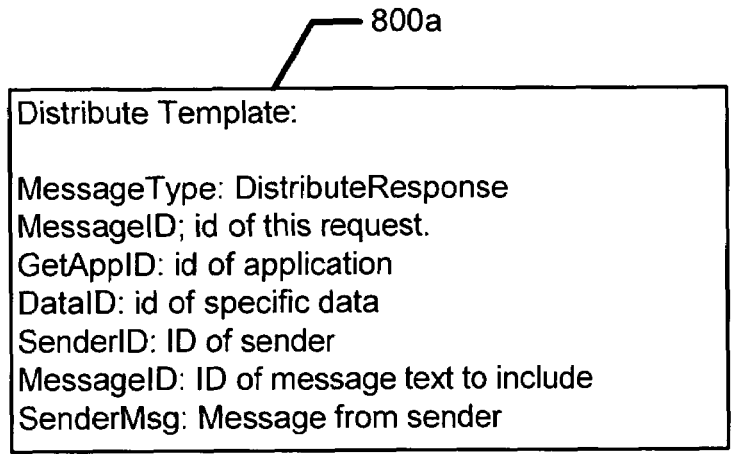
FIGS. 8A and 8B are exemplary templates according to the preferred embodiment of the present invention.

The method continues in FIG. 7B at Circle A, where the management server 540 receives the distribute request 522 from the user system 510 (step 712) and determines that the message received is a distribute request 522 (step 713). The management server 504 builds a distribute template 548 (step 714) from the request 522. FIG. 8A is an exemplary distribute template 800a according to the preferred embodiment of the present invention. The distribute template 800a includes information that is common to each of the recipients specified in the request 522. For example, it includes the message type, an identifier associated with the request 522, the application identifier 524 and other relevant data as is shown in FIG. 8A.

Referring again to FIG. 7B, once the distribute template 800a is built, the management server 540 gets a first recipient identified in the request 522 (step 715), and selects which delivery mechanism of a plurality of mechanisms 552 to call (step 716) based on the address of the recipient because each delivery mechanism 552 is associated with a communication mode, e.g., email, SMS/MMS, ftp. Once identified, the management server 540 calls the selected delivery mechanism 552 and passes the template 800a to the delivery mechanism 552 (step 717).

The selected delivery mechanism 552 utilizes the template 800a to generate and transmit a notify message 544 to the recipient (step 718). The notify message 544 includes the application identifier 524 and a setup mechanism 546. When launched on the recipient's device 530, the setup mechanism 546 determines, among other things, the device type and operating system if the application 512 is not already present on the device or if it is out-of-date, and whether any data specified in the request 522 is present on the device 530.

Figure 9:
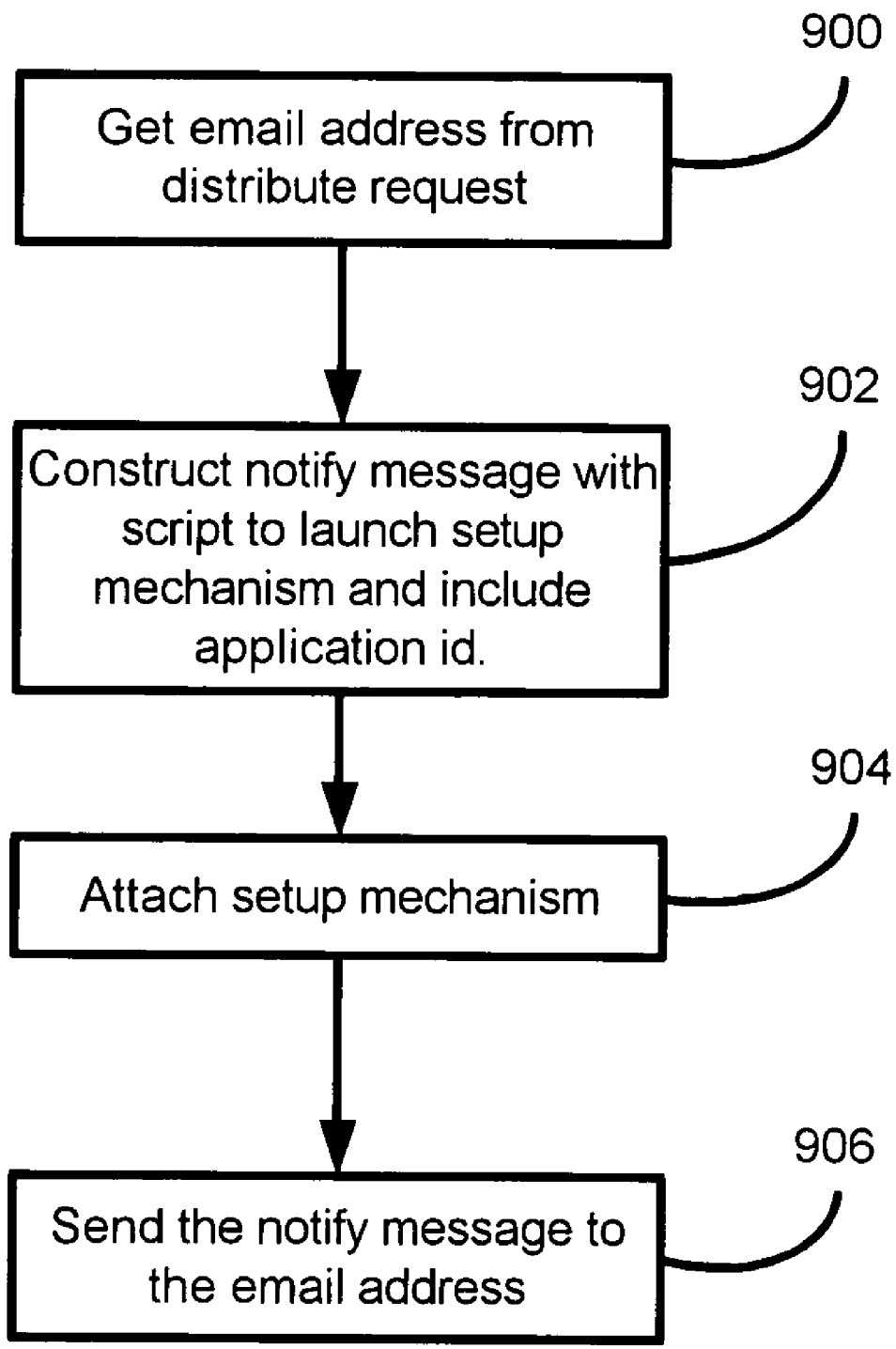
FIG. 9 is a flowchart for generating and transmitting a notify message according to a preferred embodiment of the present invention.

The process for generating and transmitting the notify message 544 (step 718) varies with the delivery mechanism 552. For example, FIG. 9 is a flowchart for generating and transmitting the notify message 544 using an email delivery mechanism according to a preferred embodiment of the present invention. In step 900, the email delivery mechanism gets the email address for the recipient from the management server 540 and constructs the notify message 544 that includes the application identifier 524 from the distribute template 552 and a script to launch the setup mechanism 546 (step 902). Next, the setup mechanism 546 is attached to the notify message 544 (step 904), and the notify message 554 is sent to the email address (step 906).

Referring again to FIG. 7B, if the message transmitted is a notify message 544 (step 719) and more recipients are present (step 720), the management server 540 gets a next recipient (step 721) and repeats steps 716-720. Otherwise, the management server 540 waits to receive another message (step 722).

After the notify message 544 is sent to the recipient's address, the distribution process continues in FIG. 7C at Circle B, when the recipient device 530 receives the notify message 544 from the management server 540 (step 723). The recipient 231 preferably selects the install button in the notify message 544 (step 724), which automatically invokes the script that launches the setup mechanism 546 (step 725).

As stated above, the setup mechanism 546 determines a number of things, including whether the application 512 is already installed on the device and if so, whether it is up-to-date. If the application 512 is not on the device or if the application 512 is out-of-date, the setup mechanism 512 determines the device type (e.g., mobile phone 502 or PC 530), the operating system environment (e.g., Windows XP or Linux) (step 726). The setup mechanism 546 then creates and sends a "get application" (GetApp) request 532 to the management server 540 (step 727). The GetApp request 532 preferably includes the application identifier 524, and data and versioning information specific to the operating system environment.

Figure 8B:
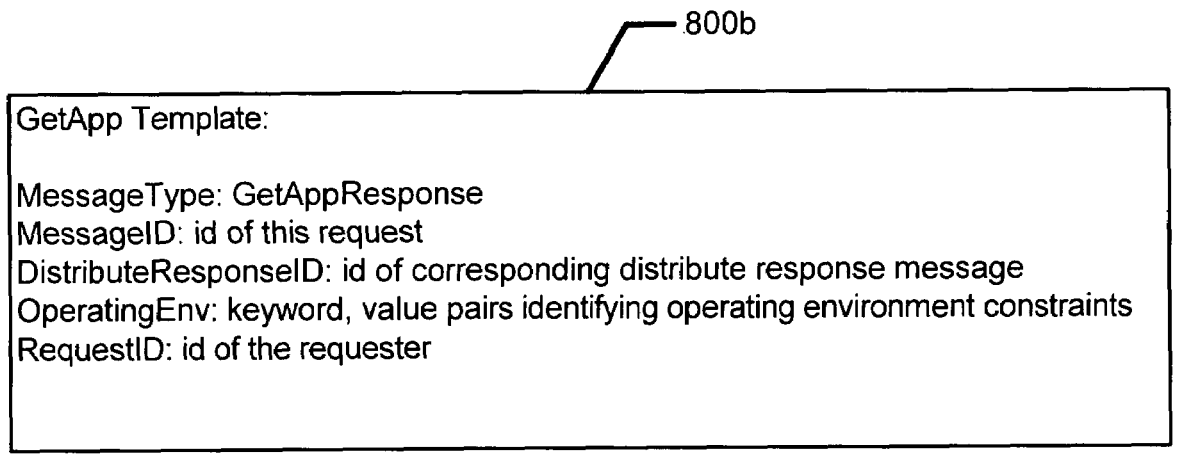

The distribution process continues to Circle C, which points back to FIG. 7B, when the management server 540 receives a message from the recipient device 530 (step 712) and determines that the message is a GetApp request 532 (step 728). In response to the GetApp request 532, the management server 540 builds a GetApp template 548 (step 729) from the request 532. FIG. 8B is an exemplary GetApp template 800b according to the preferred embodiment of the present invention. The GetApp template 800b includes the message type, an identifier associated with the request 522, the appropriate application's 512' identifier 524, an identifier associated with the corresponding distribute request 522, information identifying the operating environment constraints, and other relevant data as is shown in FIG. 8B.

Referring again to FIG. 7B, once the GetApp template 800b is built, the management server 540 selects the appropriate delivery mechanism 552 to call (step 716) based on the address of the recipient device 530. The management server 540 then calls the selected delivery mechanism 552 and passes the template 800b to the delivery mechanism 552 (step 717). The selected delivery mechanism 552 utilizes the template 800b to generate and transmit an install message 554 to the recipient (step 718), where the install message 554 includes the install image 216 associated with the appropriate version of the application 512' and/or associated data, e.g., images or album data. Note that the message 554 can also include a reference to data stored in storage 550 at the management server 540. Such data is preferably retrieved, as needed, when the application 512' is running on the recipient device 530.

After the install message 554 is sent to the recipient's address, the distribution process continues in FIG. 7C at Circle D, when the recipient device 530 receives the install message 554 from the management server 540 (step 730). The setup mechanism 546 launches the install image 216 (step 731), which automatically installs the application 512' and associated data, if any (step 732). After the application 512' has been installed persistently on the recipient device 530, the install image 216 launches the application 512' (step 733) and the application 512' displays a window 10 (FIG. 1) with the images 20 (step 734).

At this point, the setup mechanism 546 transmits an "installed" message to the management server 540 (735). The installed message is similar to that 232 (FIG. 2) in the first preferred embodiment, and preferably includes distribution data relating to the user 211, the recipient(s) 231, the application 512' and other relevant information.

The distribution process concludes in FIG. 7B at Circle E, when the management server 540 receives a message from the recipient device 530 (step 712) and determines that the message received is an installed message (step 736). The management server 540 records and stores the distribution data in storage 550 (step 737).

In a preferred embodiment, each step of the distribution process (FIG. 6) can be tracked by the management server 540. For instance, the management server 540 can log each distribute request 522, noting items such as the sending device 510, specified recipient(s) 530, and the application 512 and/or data. The management server 540 can also log GetApp requests 532 and installed messages 232 from recipients 530. Tracking such information is useful for a number of reasons. For example, the information can be used to track licensing data, and to analyze patterns of distribution that occur among users of the various applications distributed.

Through aspects of the preferred embodiments of the present invention, an integrated share button in an application or application module allows a user to distribute the application or module to specified recipients via a share function. When invoked, the share function allows the user to easily share the application or module and associated data with others without requiring detailed knowledge of the delivery mechanism. Moreover, the distribution process can be monitored and controlled by an authoritative entity, such as the licensor, or corporate IT department.

Although the present invention has been described in accordance with the embodiment shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A computer-implemented method for allowing a user to distribute an install image associated with an application in an electronic device to at least one specified recipient comprising:

presenting a graphical representation of a share function included with the application in the electronic device;

invoking the share function in response to a user selection of the graphical representation of the share function; and in response to invoking the share function, automatically retrieving, by the share function, the install image associated with the application, wherein the install image is at least one of stored on the electronic device and remotely retrievable from a location in communication with the electronic device, automatically invoking, by the share function, a delivery mechanism to generate a message addressable to at least one recipient specified by the user, and automatically attaching, by the share function, the retrieved install image to the message, wherein the install image is an installable image of the application.

2. The method of claim 1 further comprising:
receiving the install image associated with the application in a device associated with the at least one specified recipient; and
automatically installing and persistently storing the application on the device.

3. The method of claim 1, wherein the install image is a self-installing copy of the application.

4. The method of claim 1, wherein invoking a share function includes:
displaying an integrated share button to the user in a window when the application is running; and
allowing the user to select the integrated share button to automatically invoke the share function.

5. The method of claim 1, wherein invoking a share function includes:
launching the application;
displaying a share button to the user in the menu item; and
allowing the user to select the share button to automatically invoke the share function.

6. The method of claim 1, wherein invoking a share function includes:
displaying a share button to the user in a context menu; and
allowing the user to select the share button to automatically invoke the share function.

7. The method of claim 1, wherein invoking a share function includes:
displaying a share button to the user in a Program Start menu; and
allowing the user to select the share button to automatically invoke the share function.

8. The method of claim 1, wherein the install image associated with the application is stored in the electronic device.

9. The method of claim 8, comprising:
adding data associated with the application to the install image prior to attaching the install image to the message.

10. The method of claim 8, comprising:
providing a script and an install button to the message, wherein when the install button is selected by the at least one recipient, the script automatically launches the install image.

11. The method of claim 1 further comprising:
sending distribution data related to the distribution of the application to a computer system for tracking; and
storing the distribution data at the computer system.

12. The method of claim 1, wherein the application is a photo album viewing application and the method further includes:
adding album data to the install image associated with the photo album viewing application prior to sending the message including the attached install image to the at least one specified recipient.

13. The method of claim 1, wherein the install image associated with the application automatically launches the application after the install image has installed the application onto the device.

14. The method of claim 1, wherein the application comprises one or more modules, at least one of the modules including an integrated share button, which when selected by the user, invokes the share function.

15. A computer readable medium containing program instructions for allowing a user to distribute an install image associated with an application in an electronic device to at least one specified recipient, the computer readable medium comprising instructions for:
presenting a graphical representation of a share function included with the application in the electronic device;
invoking the share function in response to a user selection of the graphical representation of the share function; and
in response to invoking the share function, automatically retrieving, by the share function, the install image associated with the application, wherein the install image is at least one of stored on the electronic device and remotely retrievable from a location in communication with the electronic device, automatically invoking, by the share function, a delivery mechanism to generate a message addressable to at least one recipient specified by the user, and automatically attaching, by the share function, the retrieved install image to the message, wherein the install image is an installable image of the application.

16. The computer readable medium of claim 15 further comprising instructions for:
receiving the install image associated with the application in a device associated with the at least one specified recipient; and
automatically installing and persistently storing the application on the device.

17. The computer readable medium of claim 15, wherein the install image is a self-installing copy of the application.

18. The computer readable medium of claim 15, wherein the invoking instruction includes:
displaying an integrated share button to the user in a window when the application is running; and
allowing the user to select the share button to automatically invoke the share function.

19. The computer readable medium of claim 15, wherein the invoking instruction includes:
launching the application;
displaying a share button to the user in the menu item; and
allowing the user to select the share button to automatically invoke the share function.

20. The computer readable medium of claim 15, wherein the invoking instruction includes:
displaying a share button to the user in a context menu; and
allowing the user to select the share button to automatically invoke the share function.

21. The computer readable medium of claim 15, wherein the invoking instruction includes:
displaying a share button to the user in a Program Start menu; and
allowing the user to select the share button to automatically invoke the share function.

22. The computer readable medium of claim 15, wherein the install image associated with the application is stored in the electronic device.

23. The computer readable medium of claim 22, comprising instructions for:

adding data associated with the application to the install image prior to attaching the install image to the message.

24. The computer readable medium of claim 22, comprising instructions for:
providing a script and an install button to the message, wherein when the install button is selected by the at least one recipient, the script automatically launches the install image.

25. The computer readable medium of claim 15 further comprising instructions for:
sending distribution data related to the distribution of the application to a computer system for tracking; and
storing the distribution data at the computer system.

26. The computer readable medium of claim 15, wherein the application is a photo album viewing application and the medium further includes instructions for:
adding album data to the install image associated with the photo album viewing application prior to sending the message including the attached install image to the at least one specified recipient.

27. The computer readable medium of claim 15, wherein the install image associated with the application automatically launches the application after the install image has installed the application onto the device.

28. The computer readable medium of claim 15, wherein the application comprises one or more modules, at least one of the modules including an integrated share button, which when selected by the user, invokes the share function.

29. A system for allowing a user to distribute an install image associated with an application in an electronic device to at least one specified recipient, the system comprising:
the electronic device comprising an application having an integrated presented share button and a share function included with the application, wherein when the share function in the electronic device is invoked in response to a user selection of the integrated presented share button, the install image associated with the application is automatically retrieved by the share function, wherein the install image is at least one of stored on the electronic device and remotely retrievable from a location in communication with the electronic device, a delivery mechanism is automatically invoked, by the share function, to generate a message addressable to at least one recipient device specified by the user, the recipient device in communication with the electronic device, and the retrieved install image is automatically attached, by the share function, to the message, the install image being an installable image of the application.

30. The system of claim 29, wherein the install image, when received by the at least one recipient device specified by the user, automatically installs and persistently stores the application in the at least one user-specified device.

31. The system of claim 29, wherein the user is allowed to attach data associated with the application to the install image, thereby distributing the application and the associated data.

32. The system of claim 29, wherein the application is a photo album viewing application and the associated data includes image data.

\* \* \* \* \*